UNITED STATES PATENT OFFICE.

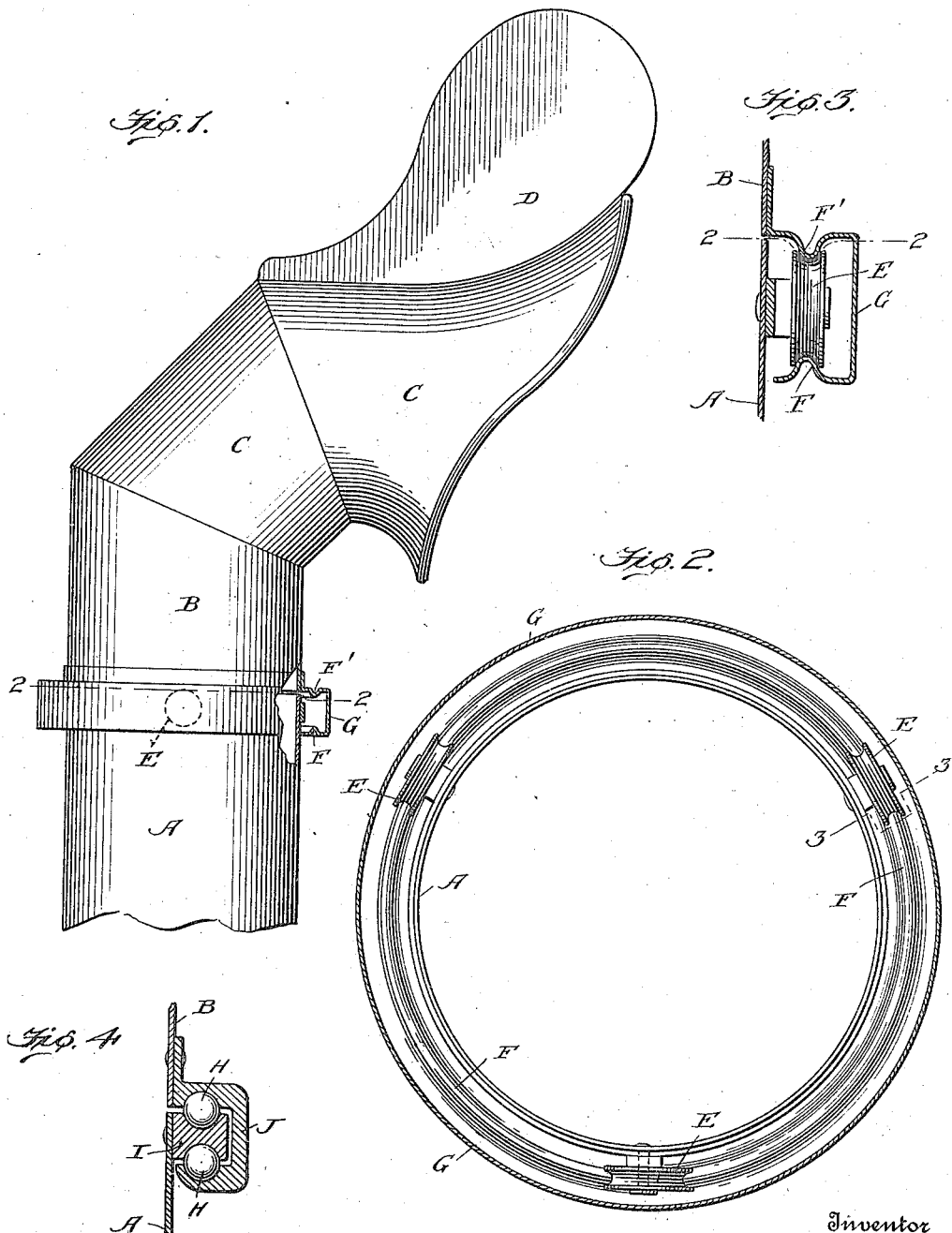

CLAUDE P. LYLE, OF ATLANTA, GEORGIA, ASSIGNOR OF ONE-HALF TO DOWMAN-DOZIER MFG. CO., OF ATLANTA, GEORGIA, A CORPORATION OF GEORGIA.

VENTILATING DEVICE.

1,263,912.  Specification of Letters Patent.  Patented Apr. 23, 1918.

Application filed September 4, 1917.  Serial No. 189,533.

*To all whom it may concern:*

Be it known that I, CLAUDE P. LYLE, a citizen of the United States, and resident of Atlanta, in the county of Fulton and State of Georgia, have invented certain new and useful Improvements in Ventilating Devices, of which the following is a specification, reference being had therein to the accompanying drawing.

The invention is shown as embodied in ventilating apparatus although a part of that apparatus is usable by itself or in different situations. An object of the invention is to produce a vane-directed ventilator in which the air passage is of substantially uniform size and unobstructed at any point. This latter feature is especially important in ventilating cotton ginning houses and the like where the outgoing air carries fiber which soon clogs the usual apparatus.

In the accompanying drawings,

Figure 1 is a side elevation, partly in section, showing a vane-directed ventilator embodying my invention.

Fig. 2 is an enlarged section on the line 2—2, Fig. 1.

Fig. 3 is a section on the line 3—3, Fig. 2.

Fig. 4 is a section corresponding to Fig. 3, showing a modification.

In these figures, A and B represent two alined nearly abutting pipes of the same diameter, C represents a curved extension of the upper pipe B, and D a vane secured to the extension C. On the exterior of the pipe B is fixed a track member G projecting sleeve-like, over the end portion of the pipe A and provided with tracks F F′ between which run a series of antifriction rollers E revolubly supported from the exterior of the adjacent end portion of the pipe A and so engaging the tracks that only rotary relative movement of the pipes is permitted. Rib tracks and groove tracks being common, ribbed tracks adapted to receive grooved rollers have been chosen for illustration. The rollers should be equally spaced around the pipe and not less than three in number. The pipes vary in diameter up to perhaps six feet, and the rollers correspondingly vary in number. The rollers, their immediate supports, and the track members are usually of bronze.

From the construction it is obvious that the weight of the freely rotating parts above is transmitted through the track F′ to the rollers E and thence to the fixed pipe A; that the track F prevents the separation of the two pipes; that the engagement of the rollers and tracks prevents lateral rocking and relative lateral displacement of the pipes; that the interior of the pipes is entirely unobstructed; and that the interior and the bearings are protected from water. The apparatus swivels freely, is practically noiseless at all times, and derangement is rare, it being purely automatic and without parts to be operated by workmen. Where very large pipes are concerned they are properly reinforced and the tracks and rollers supports are of cast metal.

Fig. 4 shows one of many possible modifications. Here the roller support I is grooved to form a track above and a track below to receive rollers which may be balls H and the member J has groove tracks to engage, respectively, the sets of rollers H. Clearly the action of this form is substantially that of the form first described.

What I claim is:

1. In a ventilator, the combination with an upright pipe having near its upper end an annular series of spaced rollers mounted on its wall in a plane, of an alining pipe having at its lower end a sleeve telescoping the upper end of the pipe first mentioned, internally enlarged to receive said rollers, and having the offsetting portions above and below the rollers provided with annular tracks engaging the upper and lower sides, respectively, of the rollers.

2. In a ventilator, the combination with an upright lower pipe bearing around its upper portion, in a horizontal plane, spaced external rollers, of an upper alined pipe provided at its lower end with a rigid weather-excluding sleeve covering the joint between the two pipes, extending horizontally outward above the rollers and returning below them, the annular outwardly and inwardly extending portions being provided with annular tracks, respectively, in rib-and-groove engagement with the upper and lower sides, respectively, of the rollers.

3. In a ventilator, the combination with an upright pipe having near its upper end an annular series of external spaced rollers in a horizontal plane, of a second alining pipe, above the first, provided at its lower end with a sleeve extending abruptly outward above the rollers to form an annular web, downward alongside the outer faces of the rollers, and again turning inward below the rollers to form a second annular web extending nearly to the pipe first mentioned, said webs being provided with tracks engaging, rib-like, the upper and lower sides, respectively, of the rollers, whereby the same rollers hold the pipes against both relative longitudinal and lateral movement while allowing them free rotary movement relatively.

In testimony whereof I hereunto affix my signature.

CLAUDE P. LYLE.

Copies of this patent may be obtained for five cents each, by addressing the "Commissioner of Patents, Washington, D. C."